United States Patent
Asano

(10) Patent No.: US 7,383,917 B2
(45) Date of Patent: Jun. 10, 2008

(54) RUNNING STABILITY CONTROL DEVICE FOR VEHICLE BASED UPON LONGITUDINAL FORCES OF WHEELS

(75) Inventor: Kenji Asano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 660 days.

(21) Appl. No.: 11/088,180

(22) Filed: Mar. 24, 2005

(65) Prior Publication Data

US 2005/0247510 A1 Nov. 10, 2005

(30) Foreign Application Priority Data

Mar. 26, 2004 (JP) .............. 2004-091512

(51) Int. Cl.
*B62D 5/00* (2006.01)
*B62D 6/00* (2006.01)

(52) U.S. Cl. .............. 180/446; 180/410; 701/41; 701/42

(58) Field of Classification Search .............. 180/410, 180/446; 701/41, 42
See application file for complete search history.

(56) References Cited

U.S. PATENT DOCUMENTS

| | | | | |
|---|---|---|---|---|
| 5,799,745 A | * | 9/1998 | Fukatani | 180/410 |
| 6,266,601 B1 | * | 7/2001 | Soga et al. | 701/74 |
| 6,308,126 B2 | * | 10/2001 | Yokoyama et al. | 701/70 |
| 6,488,109 B1 | * | 12/2002 | Igaki et al. | 180/169 |
| 2002/0147532 A1 | * | 10/2002 | Inagaki et al. | 701/41 |
| 2005/0256622 A1 | * | 11/2005 | Futterer et al. | 701/48 |
| 2005/0267666 A1 | * | 12/2005 | Suzumura et al. | 701/70 |
| 2007/0039775 A1 | * | 2/2007 | Matsuno et al. | 180/446 |

FOREIGN PATENT DOCUMENTS

| | | |
|---|---|---|
| DE | 38 26 982 C2 | 2/1989 |
| DE | 40 38 079 A1 | 6/1992 |
| DE | 101 50 605 A1 | 4/2003 |
| EP | 1 293 412 A2 | 3/2003 |
| JP | A 7-81600 | 3/1995 |
| JP | B2 2540742 | 7/1996 |
| JP | A 2002-302059 | 10/2002 |

* cited by examiner

*Primary Examiner*—Lesley D. Morris
*Assistant Examiner*—Daniel Yeagley
(74) *Attorney, Agent, or Firm*—Oliff & Berridge, PLC

(57) ABSTRACT

A running stability control device for a vehicle having a steering device capable of steering steered vehicle wheels independently of a steering operation by a driver, estimating longitudinal forces of respective vehicle wheels, computing a yaw moment generated by a difference in the longitudinal forces of the vehicle wheels at left and right sides of the vehicle, computing a first compensation amount for a steering angle for decreasing the yaw moment, computing lateral forces generated in the steered vehicle wheels when they are steered for the first steering angle compensation amount, computing a second compensation amount for the steering angle for decreasing a sum of the lateral forces generated in the front and rear vehicle wheels when the steered vehicle wheels are steered for the first steering angle compensation amount, and computing a final steering angle for the steered vehicle wheels based upon the first and second steering angle compensation amounts.

5 Claims, 3 Drawing Sheets

RUNNING STABILITY CONTROL DEVICE FOR VEHICLE BASED UPON LONGITUDINAL FORCES OF WHEELS

BACKGROUND OF THE INVENTION

1. Field of the Invention

The present invention relates to a running stability control device for a vehicle, and more particularly to a running stability control device for a vehicle for controlling the running stability of the vehicle by controlling the steering angle of the steered vehicle wheels of the vehicle.

2. Description of the Prior Art

As a running stability control device for a vehicle such as an automobile, there is known a device to steer the steered vehicle wheels by a steering device so as to cancel the yaw moment acting at the vehicle by a difference in the braking forces applied to the left and right vehicle wheels during an anti-skid control of the vehicle equipped with the steering device by which the steering angle of the steered vehicle wheels can be changed independently of the steering operation by the driver as described, for example, in the publication of Japanese Patent No. 2540742.

By such a running stability control device, when a yaw moment is applied to the vehicle due to a difference in the braking forces of the left and right vehicle wheels during an anti-skid control, the yaw moment is cancelled by the steering of the steered vehicle wheels, so that thereby the running of the vehicle in a wrong direction is prevented, and the running stability of the vehicle is improved without sacrificing the deceleration performance or the distance traversed by the vehicle which would occur when the braking force at a vehicle wheel serving at a side of the road of a higher friction coefficient is decreased.

SUMMARY OF THE INVENTION

When the yaw moment due to a difference in the braking forces of the left and right vehicle wheels is cancelled by a steering of the steered vehicle wheels, the steering device is generally steered toward a side of the road of a lower friction coefficient, whereby the vehicle is shifted laterally toward the lower friction coefficient side of the road by the steering action, whereby the running course of the vehicle is distorted toward the lower friction coefficient side of the road relative to the due running course. On the contrary, when the steering device is operated to steer the vehicle toward a side of a higher friction coefficient of the road to cancel a yaw moment applied to the vehicle by a difference in the driving forces of the left and right vehicle wheels when such a difference has occurred during an acceleration of the vehicle, the vehicle is shifted laterally toward the higher friction coefficient side of the road by a lateral force generated by such a steering control, whereby the running course of the vehicle deviates from the due course toward the higher friction coefficient side.

In view of the above-mentioned problems in the conventional running stability control device adapted to steer the steered vehicle wheels for canceling the yaw moment applied to the vehicle by a difference in the driving/braking forces of the left and right vehicle wheels, it is a primary object of the present invention to provide a running stability control device for a vehicle by which a deviation of the vehicle from the normal running course due to a difference in the driving/braking force of the left and right vehicle wheels is effectively prevented so as to definitely improve the stability of the running of the vehicle, thereby effectively decreasing a lateral shifting of the vehicle from the normal running course as induced by a lateral force generated in the steered vehicle wheels due to the operation of the steering device.

According to the present invention, the above-mentioned object is accomplished by a running stability control device for a vehicle having a steering device capable of steering steered vehicle wheels independently of a steering operation by a driver, the running stability control device comprising a computing device for estimating longitudinal forces of respective vehicle wheels, computing a yaw moment generated by a difference in the longitudinal forces of the vehicle wheels at left and right sides of the vehicle, computing a first compensation amount for a steering angle for steering the steered vehicle wheels to decrease the yaw moment due to the difference in the longitudinal forces of the left and right side vehicle wheels, computing lateral forces generated in the vehicle wheels at front and rear of the vehicle when the steered vehicle wheels are steered for the first steering angle compensation amount, computing a second compensation amount for the steering angle of the steered vehicle wheels for decreasing a sum of the lateral forces generated in the front and rear vehicle wheels when the steered vehicle wheels are steered for the first steering angle compensation amount, and computing a final steering angle for the steered vehicle wheels based upon the first and second steering angle compensation amounts, and operating the steering device for steering the steered vehicle wheels so that the steered vehicle wheels are steered for the final steering angle.

According to such a running stability control device, since the yaw moment due to a difference in the longitudinal forces acting in the left and right side vehicle wheels is computed, a first steering angle compensation amount for the steered vehicle wheels is computed for decreasing the yaw moment, a lateral force generated in the front and rear vehicle wheels due to the steering of the steered vehicle wheels for the first steering angle compensation amount is computed, a second steering angle compensation amount for the steered vehicle wheels is computed for decreasing the sum of the lateral forces generated in the front and rear vehicle wheels, and a final steering angle for the steered vehicle wheels is computed based upon the first and second steering angle compensation amounts, so that the steered vehicle wheels are steered for the final steering angle, a deviation of the vehicle from the normal course due to the difference in the driving/braking forces in the left and right side vehicle wheels is effectively prevented so as definitely improve the running stability of the vehicle, while decreasing the overall lateral force of the vehicle, thereby effectively decreasing a lateral deviation of the vehicle from the normal running course due to the lateral force generated in the vehicle wheels due to the steering control.

The running stability control device according to the present invention may be so constructed that the computing device estimates a slip angle of the vehicle when the steered vehicle wheels are steered for the first steering angle compensation amount, sets out a yaw angle of the vehicle to be an angle laterally opposite to the slip angle, and computes the second steering angle modification amount as a modification steering angle for the steered vehicle wheels for attaining the yaw angle.

The yaw angle of the vehicle may set out to be not larger than the slip angle of the vehicle.

More concretely, the yaw angle of the vehicle may be set out according to the below-mentioned formula 18.

According to such a running stability control device, since the slip angle of the vehicle due to the steering of the steered vehicle wheels for the first steering angle compensation amount is estimated, an angle of the vehicle laterally opposite to the slip angle is set out as a yaw angle, and a second steering angle compensation amount for the steering angle for the steered vehicle wheels is computed to attain the target yaw angle, the lateral forces generated in the front and rear vehicle wheels by the steered vehicle wheels being steered for the first steering angle compensation amount is correctly compensated by the second steering angle compensation amount through the computation of the slip angle of the vehicle.

The running stability control device according to the present invention may be so constructed that the computing device estimates a temporary target steering angle based upon the steering operation of the driver, and computes a final target steering angle by modifying the temporary target steering angle by the first and second steering angle compensation amounts.

According to such a running stability control device, since a temporary target steering angle based upon the steering operation of the driver is modified by the first and second steering angle compensation amounts to provide a final target steering angle for the steered vehicle wheels, the vehicle runs correctly along a course instructed by the steering operation of the driver regardless of a difference in the longitudinal forces of the respective vehicle wheels.

The running stability control device according to the present invention may be so constructed that it is operated to execute the driving/braking force control for stabilizing the running stability of the vehicle when neither a spin suppress control nor a driftout suppress control is being executed.

By denoting vehicle speed as V, yaw rate of the vehicle as $\gamma$, slip angle of the vehicle as $\beta$, steering angle of the front vehicle wheels as $\delta f$, mass of the vehicle as M, yaw inertial moment of the vehicle as Iz, cornering power of the front vehicle wheels as Cpf, cornering power of the rear vehicle wheels as Cpr, longitudinal distance between the mass center of the vehicle and the axis of the front vehicle wheels as Lf, longitudinal distance between the mass center of the vehicle and the axis of the rear vehicle wheels as Lr, yaw moment due to a difference in the longitudinal forces of the left and right vehicle wheels as Mf, change rate of the yaw rate $\gamma$ of the vehicle as $\gamma d$, change rate of the slip angle $\beta$ of the vehicle as $\beta d$, and a11, a12, a21, a22, b1, b2 and c2 as such amounts expressed by the below-mentioned formulae 2-8, respectively, there is a relationship such as expressed by the following formula 1.

$$\begin{bmatrix} \beta d \\ \gamma d \end{bmatrix} = \begin{bmatrix} a11 & a12 \\ a21 & a22 \end{bmatrix} \begin{bmatrix} \beta \\ \gamma \end{bmatrix} + \begin{bmatrix} b1 \\ b2 \end{bmatrix} \delta f + \begin{bmatrix} 0 \\ c2 \end{bmatrix} Mf \tag{1}$$

$$a11 = -\frac{Cpf + Cpr}{MV} \tag{2}$$

$$a12 = -1 - \frac{CpfLf + CprLr}{MV^2} \tag{3}$$

$$a21 = -\frac{CpfLf - CprLr}{Iz} \tag{4}$$

$$a22 = -\frac{CpfLf^2 + CprLr^2}{IzV} \tag{5}$$

$$b1 = \frac{Cpr}{MV} \tag{6}$$

$$b2 = \frac{CpfLf}{Iz} \tag{7}$$

$$c2 = -\frac{1}{Iz} \tag{8}$$

By denoting the Laplace operator as s, a transfer function $H\gamma\delta$ from the front vehicle wheel steering angle $\delta f(s)$ to the yaw rate $\gamma(s)$ of the vehicle and a transfer function $H\gamma_M$ from the yaw moment Mf(s) due to a difference in the longitudinal forces of the left and right vehicle wheels to the yaw rate $\gamma(s)$ of the vehicle are respectively expressed by the following formulae 9 and 10.

$$H_{\gamma\delta} = \frac{\gamma(s)}{\delta f(s)} = \frac{b2(s-a11) + a21b1}{s^2 - (a11+a22)s + a11a22 - a12a21} \tag{9}$$

$$H_{\gamma M} = \frac{\gamma(s)}{Mf(s)} = \frac{c2(s-a11)}{s^2 - (a11+a22)s + a11a22 - a12a21} \tag{10}$$

According to the above formulae 9 and 10 there exists a relationship such as shown by the following formula 11, from which the steering angle $\delta f(s)$ of the front steered vehicle wheels to cancel the yaw moment Mf(s) due to the difference in the longitudinal forces of the left and right vehicle wheels is obtained by the following formula 12.

$$H_{\gamma\delta}\delta f(s) = H_{\gamma M} Mf(s) \tag{11}$$

$$\delta f(s) = -\frac{c2(s-a11)}{b2s - a11b2 + a21b1} Mf(s) \tag{12}$$

From the above formula 12 the steering angle $\delta f$ of the steered front vehicle wheels to cancel the yaw moment Mf due to the difference in the longitudinal forces of the left and right vehicle wheels is obtained as the following formula 13 as a static value not considering a transient response for convenience.

$$\delta f(t) = \frac{c2a11}{-a11b2 + a21b1} Mf(t) \tag{13}$$

Therefore, the running stability control device may be so constructed as to compute a first steering angle compensation amount according to the above formula 12 or 13.

Further, the slip angle $\alpha f$ of the front vehicle wheels and the slip angle $\alpha r$ of the rear vehicle wheels are computed by the following formulae 14 and 15, respectively.

$$\alpha f = \beta + \frac{Lf}{V}\gamma - \delta f \tag{14}$$

$$\alpha r = \beta - \frac{Lr}{V}\gamma \tag{15}$$

Therefore, in order for the lateral force Fyf=Cpf·$\alpha f$ generated by the steered front vehicle wheels to balance with the lateral force Fyr=Cpr·$\alpha r$ of the rear vehicle wheel as shown in FIG. 4, it should be such that Fyf+Fyr=0, i.e., the following formula 16 is established.

$$Cpf\left(\beta + \frac{Lf}{V}\gamma - \delta f\right) = -Cpr\left(\beta - \frac{Lr}{V}\gamma\right) \qquad (16)$$

Therefore, the slip angle β of the vehicle in the case that the steering angle of the steered front vehicle wheels is controlled to cancel the yaw moment Mf due to the difference in the longitudinal forces between the left and right vehicle wheels is expressed by the following formula 17.

$$\beta = \frac{Cpr}{Cpf + Cpr}\delta f + \frac{(LrCpf - LfCpr)\gamma}{(Cpf + Cpr)V} \qquad (17)$$

Therefore, in order for the lateral force Cpf·αf generated by the front vehicle wheels due to the control of the steering angle of the steered front vehicle wheels to be cancelled by the lateral force Cpr·αr of the rear vehicle wheels, the yaw angle βt of the vehicle is to be such that is opposite in the lateral direction to the slip angle β of the vehicle expressed by the formula 17 and less than the slip angle β, more desirably, a value expressed by the following formula 18.

$$\beta t = -\beta \qquad (18)$$
$$= -\frac{Cpr}{Cpf + Cpr}\delta f - \frac{(LrCpf - LfCpr)\gamma}{(Cpf + Cpr)V}$$

BRIEF DESCRIPTION OF THE DRAWINGS

In the accompanying drawing.

DESCRIPTION OF THE PREFERRED EMBODIMENT

In the following, the present invention will be described in more detail with respect to a preferred embodiment thereof.

Figure 1:
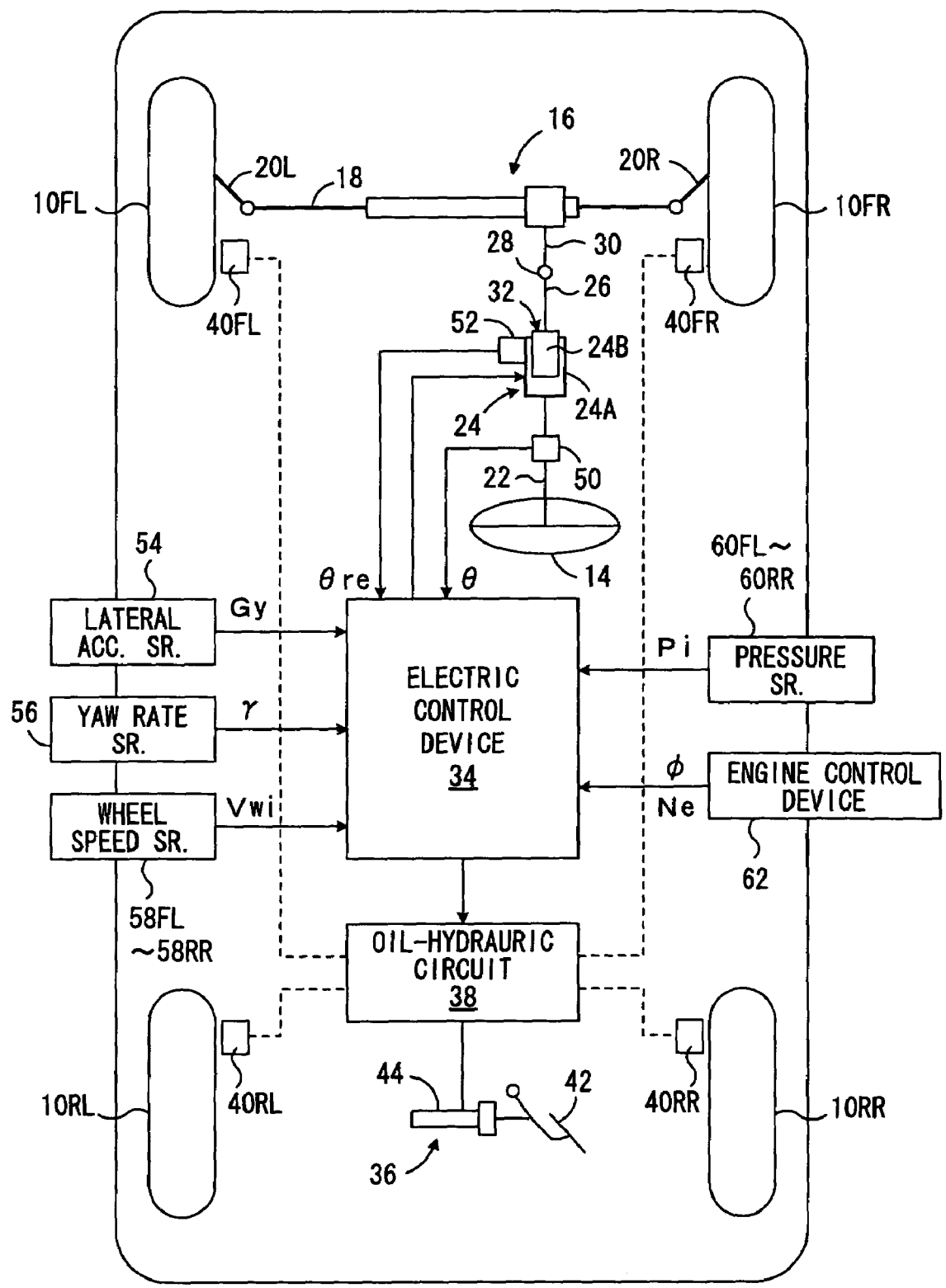
FIG. 1 is a diagrammatic view showing an embodiment of the stability control device of the vehicle according to the present invention applied to a four wheel drive vehicle equipped with a semi-steer-by-wire type steering angle varying device as an automatic steering device.

Referring to FIG. 1 showing an embodiment of the running stability control device of the vehicle according to the present invention applied to a rear driven vehicle equipped with a steering device incorporating a steering angle varying device operating as an automatic steering device in a schematic illustration, 10FL and 10FR are steered front left and front right vehicle wheels of the vehicle 12, and 10RL and 10RR are driving rear left and rear right vehicle wheels. The front left and front right vehicle wheels 10FL and 10FR are steered according to the steering operation of a steering wheel 14 by a driver via a rack-and-pinion type power steering device 16, a rack bar 18 and tie rods 20L and 20R. The steering wheel 14 is connected with a pinion shaft 30 of the power steering device 16 via an upper steering shaft 22, a steering angle varying device 24, a lower steering shaft 26 and a universal joint 28. In the shown embodiment, the steering angle varying device 24 includes an electric motor 32 having a housing 24A connected to the lower end of the upper steering shaft 22 and a rotor 24B connected to the upper end of the lower steering shaft 26.

The steering angle varying device 24 variably rotates the lower steering shaft 26 relative to the upper steering shaft 22 so as to variably change the ratio of the steering angle of the front left and front right vehicle wheels 10FL and 10FR relative to the steering rotation of the steering wheel 14 as controlled by a steering control portion of an electric control device 34. The steering angle varying device 24 normally rotates the lower steering shaft 26 in a predetermined relationship relative to the rotation of the upper steering shaft 22, but automatically changes the rotation of the lower steering shaft 26 relative to the upper steering shaft 22 according to its automatic control operation as required.

When a failure has occurred in the steering angle varying device 24 such that the lower steering shaft 26 is not rotated relative to the upper steering shaft 22, a locking means not shown in FIG. 1 is actuated, so that the relative rotation of the housing 24A and the rotor 24B of the electric motor 32 is mechanically locked up not to change the rotational relationship between the upper steering shaft 22 and the lower steering shaft 26.

The power steering device 16 may be an oil-hydraulic type power steering device or an electrically driven power steering device. However, it is desirable that an electric type power steering device is used with a ball-screw type motion conversion mechanism for converting the rotation of an electric motor to a reciprocal movement of the rack bar 18 so as to decrease the reaction torque transmitted from the steering angle varying device 24 to the steering wheel 14.

The braking forces to be applied to the respective vehicle wheels are controlled by the pressures Pi (i=fl, fr, rl and rr) generated in wheel cylinders 40FL, 40FR, 40RL and 40RR by an oil-hydraulic circuit 38. Although not shown in the figure, the oil hydraulic circuit 38 includes an oil reservoir, an oil pump and various valves so as to control the pressures in the respective wheel cylinders normally according to the pressure in a master cylinder 44 of a braking device 36 operated according to a depression of a brake pedal 42 by the driver, but the oil hydraulic circuit 38 is also controlled by the electric control device 34 as described in detail hereinbelow.

In the shown embodiment, a steering angle sensor 50 is provided to detect the rotational angle of the upper steering shaft 22 as a steering angle θ, and a rotational angle sensor 52 is provided to detect the relative rotation between the housing 24A and the rotor 24B of the steering angle varying device 24 as a relative rotation angle θre. The outputs of these sensors are supplied to the electric control device 34.

The electric control device 34 is supplied with a signal indicating lateral acceleration Gy of the vehicle from a lateral acceleration sensor 54, a signal indicating yaw rate γ of the vehicle from a yaw rate sensor 56, signals indicating wheel speeds Vwi (i=fl, fr, rl and rr) of the respective vehicle wheels from wheel speed sensors 58FL-58RR, signals indicating the braking pressures Pi in the respective wheel cylinders from pressure sensors 60FL-60RR, signals indicating throttle opening φ and engine rotation speed Ne from an engine control device 62, and other signals.

Although not shown in detail in FIG. 1, the electric control device 34 has a steering control portion for controlling the steering angle varying device 24, a braking control portion for controlling the braking forces at the respective vehicle wheels, and a stability control portion for controlling the running stability of the vehicle, constructed by a micro computer including CPU, ROM, RAM, input/output ports and a bilateral common bus interconnecting these elements. The steering angle sensor 50, the rotational angle sensor 52, the lateral acceleration sensor 54 and the yaw rate sensor 56 detect the steering angle θ, the relative rotation angle θre, the lateral acceleration Gy and the yaw rate γ to be positive when the vehicle is steered toward leftward.

As described hereinunder, the electric control device 34 estimates the vehicle speed V normally based upon the wheel speeds Vwi of the respective vehicle wheels, computes the steering gear ratio Rg to accomplish a predetermined steering performance based upon the vehicle speed V, computes a temporary target steering angle δst based upon the steering angle θ indicating the steering operation by the driver and the steering gear ratio Rg, and computes a target yaw rate γt of the vehicle based upon the temporary target steering angle δst and the vehicle speed V.

Then the electric control device 34 computes a difference Δγ between the target yaw rate γt and the actual yaw rate γ of the vehicle detected by the yaw rate sensor 54, and when the yaw rate difference Δγ is not larger than a standard value γo (positive constant), controls the steering angle varying device 24 so that the steering angle of the front left and front right vehicle wheels becomes the temporary target steering angle δst, whereby the front left and front right vehicle wheels 10FL and 10FR are steered according to the steering operation of the driver in a predetermined steering performance.

The electric control device 34 computes a spin quantity SS indicating a spinning tendency of the vehicle and a drift out quantity DS indicating a drifting out tendency of the vehicle based upon a running condition quantity of the vehicle such as the lateral acceleration Gy of the vehicle, computes target braking pressures Pti (i=fl, fr, rl and rr) of the respective vehicle wheels for stabilizing the vehicle stability against the spin quantity SS and the drift out quantity DS, and executes a stability control to control the braking pressures Pi of the respective vehicle wheels to be the target braking pressures Pti so that thereby the vehicle behavior is stabilized.

Further, the electric control device 34 computes the vehicle speed Vb and the braking slips SBi (i=fl, fr, rl and rr) of the respective vehicle wheels according to a manner known in this art, and when a condition for starting an anti-skid control is detected by the braking slips SBi becoming larger than certain threshold values for starting the anti-skid control (ABS), executes the anti-skid control by controlling the braking pressures Pi of the respective vehicle wheels until a condition for ending the anti-skid control is detected by the braking slips decreasing below predetermined values.

The electric control device 34 computes the vehicle speed Vb and the acceleration slips SAi (i=fl, fr, rl and rr) based upon the wheel speeds Vwi of the respective vehicle wheels in a manner known in this art, and when a condition for starting the traction control is detected by the acceleration slips SAi becoming larger than certain threshold values for starting the traction control (TRC control), executes the traction control until a condition for ending the traction control is detected by the acceleration slips decreasing below determined values.

The above-mentioned the spin/driftout suppress control, anti-skid control, and traction control do not form the gist of the present invention, and these controls may be executed according to any manner known in this art.

The electric control device 34 estimates the longitudinal forces Fxi of the respective vehicle wheels when the anti-skid control or the traction control is executed, computes the yaw moment Mf due to a difference in the longitudinal forces applied to the left and right vehicle wheels, and computes a first steering angle compensation amount Δδct for the front steered vehicle wheels for applying a counter yaw moment Mc to the vehicle for canceling the yaw moment induced by the difference in the longitudinal forces of the vehicle wheels at the left and right sides of the vehicle.

The electric control device 34 computes a yaw rate difference Δγ as a difference between the actual yaw rate γ and the target yaw rate γt of the vehicle, computes a yaw angle difference Δβ of the vehicle as a difference between the actual yawing direction and the yawing direction intended by the driver of the vehicle by integrating the yaw rate difference Δγ, computes a yaw angle βt of the vehicle for preventing the change of the yawing direction of the vehicle by the front left and front right vehicle wheels being steered for the first steering angle compensation amount Δδct, computes a second steering angle compensation amount Δδyt for the front steered vehicle wheels to decrease the yaw angle difference Δβ to 0 for accomplishing the yaw angle βt based upon the yaw angle difference Δβ and the target yaw angle βt, and computes a final target steering angle δt for the front steered vehicle wheels as a sum of the temporary target steering angle δst, the first steering angle compensation amount Δδct and the second steering angle compensation amount Δδyt. Then, the electric control device 34 controls the steering angle varying device 24 so that the steering angle of the front left and front right vehicle wheels becomes the final target steering angle δt.

Figure 2:
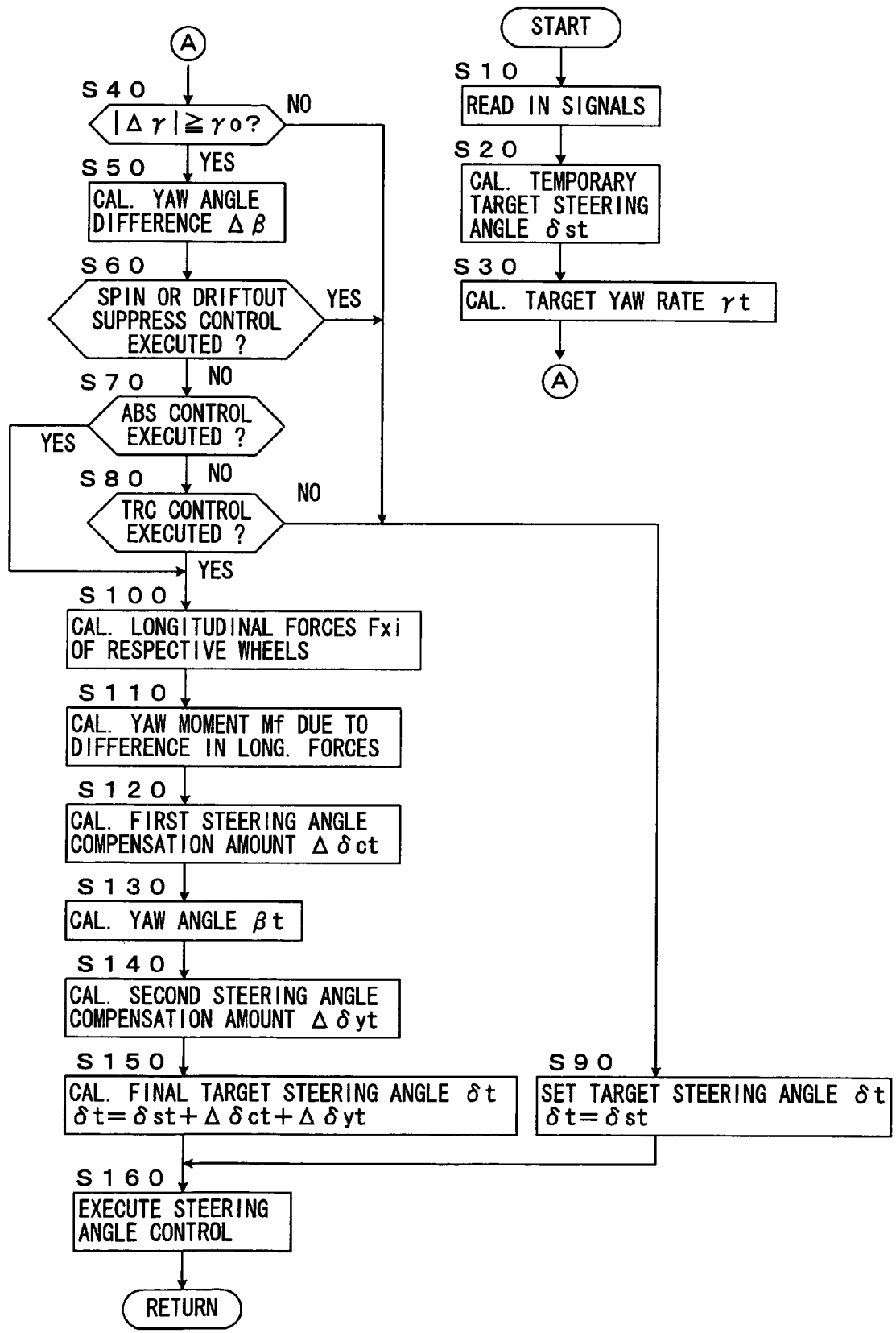
FIG. 2 is a flowchart showing the steering angle control of the front left and front right vehicle wheels.

FIG. 2 is a flowchart showing the above-mentioned control operations. The control according to the flowchart of FIG. 2 is started by a closing of an ignition switch not shown in the figure and cyclically repeated at a predetermined time interval.

Figure 3:
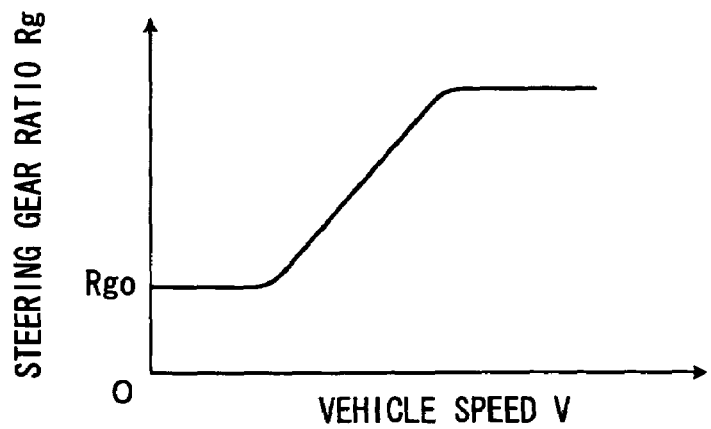
FIG. 3 is a map showing the performance of the steering gear ratio Rg according to the vehicle speed V.
Figure 4:
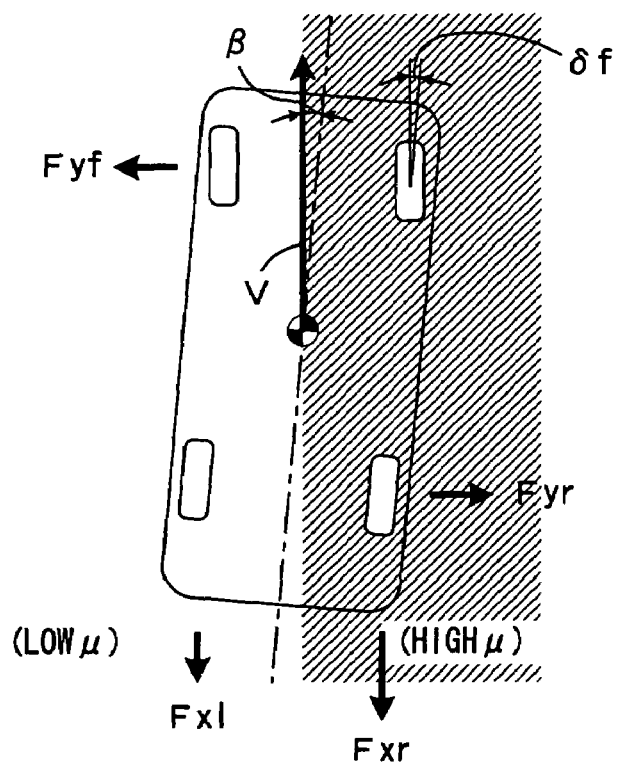
FIG. 4 is a diagrammatical view showing the running condition of a vehicle on a road in which the friction coefficient of the road is different on the left and right sides of the road.

In step 10, the signals indicating the steering angle θ and others are read in, and then in step 20, the vehicle speed V is estimated based upon the wheel speeds Vwi of the respective vehicle wheels, and the steering gear ratio Rg is computed based upon the vehicle speed by referring to a map such as shown in FIG. 3. Then the temporary target steering angle δst for the front left and front right vehicle wheels is computed according to the following formula 19.

$$\delta st = \theta / Rg \quad (19)$$

The temporary target steering angle δst is a controlled steering angle which is a sum of the steering angle δw (=θ/Rgo) based upon a standard steering gear ratio Rgo to correspond to the steering operation by the driver and an additional steering angle δc for obtaining a predetermined steering performance. The predetermined steering performance itself is not concerned with the essence of the present invention, and may be determined in any manner known in this art, as, for example, varied according to the steering speed.

In step 30, a standard yaw rate γe is computed according to the following formula 20 based upon the wheel base H, a stability factor Kh, the vehicle speed V and the temporary target steering angle δst. The standard yaw rate γe may be computed to incorporate the lateral acceleration Gy of the vehicle in view of the dynamic performance of the yaw rate.

$$\gamma e = V \cdot \delta st / (1 + Kh V^2) H \qquad (20)$$

Then, the target yaw rate γt of the vehicle is computed according to the following formula 21, wherein T is a time constant and s is the Laplace operator.

$$\gamma t = \gamma e / (1 + Ts) \qquad (21)$$

In step 40, a yaw rate difference Δγ is computed as a difference between the target yaw rate γt and the actual yaw rate γ of the vehicle. Then it is judged if the absolute value of the yaw rate difference Δγ is equal to or larger than a standard value γo (positive constant). When the answer is yes, the control proceeds to step 50, whereas when the answer is no, the control proceeds to step 90.

In step 50, a yaw angle difference Δβ of the vehicle is computed as a difference between the actual direction of the vehicle and that intended by the driver by, for example, the yaw rate difference Δγ being integrated.

In step 60, it is judged if a spin suppress control or a drift out suppress control is being executed. When the answer is no, the control proceeds to step 70, whereas when the answer is yes, the control proceeds to step 90.

In step 70, it is judged if an anti-skid control is being executed. When the answer is no, the control proceeds to step 80, whereas when the answer is yes, the control proceeds to step 100.

In step 80, it is judged if a traction control is being executed for the rear left or rear right vehicle wheel serving as the driving vehicle wheels. When the answer is yes, the control proceeds to step 100, whereas when the answer is no, the control proceeds to step 90.

In step 90, the temporary target steering angle δst is set for a target steering angle δt for the front left and front right vehicle wheels.

In step 100, by denoting the inertial moments of the respective vehicle wheels as Ji, rotational angular accelerations of the respective vehicle wheels as Vwdi, effective radius of the vehicle wheels as R, and sums of braking torques Tbi of the respective vehicle wheels (negative values) and driving torques Tti of the respective vehicle wheels (positive values) as Txi, the longitudinal forces (driving/braking forces) of the respective vehicle wheels Fxi (i=fl, fr, rl and rr) are computed according to the following formula 22.

$$Ji \cdot Vwdi = R \cdot Fxi + Txi$$

$$Fxi = (Ji \cdot Vwdi - Txi) / R \qquad (22)$$

The rotational angular accelerations Vwdi of the respective vehicle wheels are computed as a differentiation of each of the wheel speeds Vwi. The braking torques Tbi are computed based upon the master cylinder pressure Pm detected by a pressure sensor not shown in the figure and a pressure-braking torque conversion factor determined according to the design of the braking device 36. The driving torques Tdi are computed based upon the engine driving torque Te and a factor determined according to the design of the driving system, wherein the engine driving torque Te is computed based upon the throttle opening φ and the engine rotation speed Ne input from the engine control device 62. The braking torques Tbi and the driving torques Tdi may be directly detected by torque sensors.

In step 110, by denoting the tread of the vehicle as T, the yaw moment Mf due to the difference in the longitudinal forces acting at the left and right vehicle wheels is computed based upon the longitudinal forces Fxi of the respective vehicle wheels according to the following formula 23.

$$Mf = \{(Fxfr + Fxr) - (Fxfl + Fxrl)\} \cdot T/2 \qquad (23)$$

In step 120, a first steering angle compensation amount Δδct for the front left and front right vehicle wheels for generating a counter yaw moment by the steering of the front left and front right vehicle wheels for canceling the yaw moment Mf is computed according to the following formula 24 corresponding to the above-mentioned formula 13. The first steering angle compensation amount Δδct may be computed according to a formula corresponding to the above-mentioned formula 12.

$$\Delta \delta ct = \frac{c2a11}{-a11b2 + a21b1} Mf \qquad (24)$$

In the calculation by the formula 24 or the formula corresponding to the above-mentioned formula 12, the cornering power Cpf of the front vehicle wheels and the cornering power Cpr of the rear vehicle wheels should be modified according to the slip ratios of the respective vehicle wheels.

In step 130, a yaw angle βt of the vehicle for canceling the lateral forces generated by the front left and front right vehicle wheels due to the steering thereof for the first steering angle compensation amount Δδct by a lateral force of the rear left and rear right vehicle wheels is computed according to the above-mentioned formula 18.

In step 140, the second steering angle compensation amount Δδyt for the front left and front right vehicle wheels for making the yaw angle difference Δβ to 0 by attaining the yaw angle βt is computed based upon the yaw angle difference Δβ and the yaw angle βt according to the following formula 25, wherein Kx is a predetermined factor.

$$\Delta \delta yt = Kx (\Delta \beta + \beta t) \qquad (25)$$

In step 150, a final target steering angle δt for the front left and front right vehicle wheels is computed as a sum of the temporary target steering angle δst, the first steering angle compensation amount Δδct and the second steering angle compensation amount δβyt. Then in step 160, the steering angle of the front left and front right vehicle wheels is controlled by the steering angle varying device 24 so that the steering angle of the front left and front right vehicle wheels becomes the final target steering angle δt.

Although the present invention has been described in detail with respect to a particular embodiment thereof, it will be apparent for those skilled in the art that various modifications are possible within the scope of the present invention.

For example, although in the shown embodiment, the yaw angle βt of the vehicle is a yaw angle which is the same in the magnitude as the slip angle β of the vehicle and opposite thereto in the lateral direction, the yaw angle βt may be an angle which is smaller than the slip angle β in the magnitude and opposite in the lateral direction.

Further, although in the shown embodiment, the counter yaw moment applied to the vehicle for canceling the yaw moment Mf due to the difference in the longitudinal forces is the same in the magnitude as the yaw moment Mf and opposite in the direction, the counter yaw moment may be smaller than the yaw moment Mf in the magnitude.

Further, although in the shown embodiment, steps 100-150 are not executed when a spin or driftout suppress control is being executed, the control of steps 100-150 may be executed even when a spin or driftout control is being executed with a control for sharing the driving/braking force between the left and right vehicle wheels.

Further, although in the shown embodiment, the vehicle is a rear driven vehicle, the present invention may be applied to a four wheel drive vehicle, or a wheel-in-motor type vehicle in which the respective vehicle wheels are driven by respective driving motors.

The invention claimed is:

1. A running stability control device for a vehicle having a steering device capable of steering steered vehicle wheels independently of a steering operation by a driver, the running stability control device comprising a computing device for estimating longitudinal forces of respective vehicle wheels, computing a yaw moment generated by a difference in the longitudinal forces of the vehicle wheels at left and right sides of the vehicle, computing a first compensation amount for a steering angle for steering the steered vehicle wheels to decrease the yaw moment due to the difference in the longitudinal forces of the left and right side vehicle wheels, computing lateral forces generated in the vehicle wheels at front and rear of the vehicle when the steered vehicle wheels are steered for the first steering angle compensation amount, computing a second compensation amount for the steering angle of the steered vehicle wheels for decreasing a sum of the lateral forces generated in the front and rear vehicle wheels when the steered vehicle wheels are steered for the first steering angle compensation amount, and computing a final steering angle for the steered vehicle wheels based upon the first and second steering angle compensation amounts, and operating the steering device for steering the steered vehicle wheels so that the steered vehicle wheels are steered for the final steering angle.

2. A running stability control device according to claim 1, wherein the computing device estimates a slip angle of the vehicle when the steered vehicle wheels are steered for the first steering angle compensation amount, sets out a yaw angle of the vehicle to be an angle laterally opposite to the slip angle, and computes the second steering angle modification amount as a modification steering angle for the steered vehicle wheels for attaining the yaw angle.

3. A running stability control device according to claim 2, wherein the yaw angle of the vehicle is set out to be not larger than the slip angle of the vehicle.

4. A running stability control device according to claim 2, wherein the yaw angle βt of the vehicle is set out according to the following formula:

$$\beta t = -\frac{Cpr}{Cpf + Cpr}\delta f - \frac{(LrCpf - LfCpr)\gamma}{(Cpf + Cpr)V}$$

where V, γ, δf, Cpf, Cpr, Lf and Lr are vehicle speed, yaw rate of the vehicle, steering angle of the front vehicle wheels, cornering power of the front vehicle wheels, cornering power of the rear vehicle wheels, longitudinal distance between the mass center of the vehicle and the axis of the front vehicle wheels and longitudinal distance between the mass center of the vehicle and the axis of the rear vehicle wheels, respectively.

5. A running stability control device according to claim 1, wherein the computing device estimates a temporary target steering angle based upon the steering operation of the driver, and computes a final steering angle by modifying the temporary target steering angle by the first and second steering angle compensation amounts.

* * * * *